US010560734B2

(12) United States Patent
Jassin et al.

(10) Patent No.: US 10,560,734 B2
(45) Date of Patent: *Feb. 11, 2020

(54) VIDEO SEGMENTATION AND SEARCHING BY SEGMENTATION DIMENSIONS

(71) Applicant: MICROSOFT TECHNOLOGY LICENSING, LLC, Redmond, WA (US)

(72) Inventors: Ohad Jassin, Tel-Mond (IL); Avner Levi, Kiryat Ono (IL); Oron Nir, Herzelia (IL); Ori Ziv, Givatayim (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,972

(22) Filed: Apr. 20, 2017

(65) Prior Publication Data

US 2018/0035152 A1 Feb. 1, 2018

Related U.S. Application Data

(60) Provisional application No. 62/369,200, filed on Aug. 1, 2016.

(51) Int. Cl.
*H04N 21/262* (2011.01)
*H04N 21/234* (2011.01)
(Continued)

(52) U.S. Cl.
CPC . *H04N 21/26258* (2013.01); *H04N 21/23418* (2013.01); *H04N 21/234345* (2013.01)

(58) Field of Classification Search
None
See application file for complete search history.

(56) References Cited

U.S. PATENT DOCUMENTS

| 7,599,554 B2 | 10/2009 | Agnihotri et al. |
| 7,715,475 B1 | 5/2010 | Puri et al. |

(Continued)

FOREIGN PATENT DOCUMENTS

EP 2555131 A2 2/2013

OTHER PUBLICATIONS

Sidiropoulos, et al., "Temporal Video Segmentation to Scenes Using High-Level Audiovisual Features", In Journal of IEEE Transactions on Circuits and Systems for Video Technology, vol. 21, No. 8, Aug. 2011, pp. 1163-1177.

(Continued)

*Primary Examiner* — Hai V Tran
(74) *Attorney, Agent, or Firm* — Alleman Hall Creasman & Tuttle LLP

(57) ABSTRACT

In various embodiments, methods and systems for implementing video segmentation are provided. A video management system implements a video segment manager that supports generating enhanced segmented video. Enhanced segmented video is a time-based segment of video content. Enhanced segmented video is generated based on a video content cognitive index, segmentation dimensions, segmentation rules and segment reconstruction rules. The video content cognitive index is built for indexing video content. Segmentation rules are applied to the video content to break the video content into time-based segments, the time-based segments are associated with corresponding segmentation dimensions for the video content. Segment reconstruction rules are then applied to the time-based segments to reconstruct the time-based segments into enhanced segmented video. The enhanced segmented video and corresponding values of the segmentation dimensions can be leveraged as distinct portions of the video content for different types of functionality in the video management system.

8 Claims, 9 Drawing Sheets

(51) Int. Cl.
  *H04N 21/2343* (2011.01)
  *H04N 21/266* (2011.01)
  *H04N 21/482* (2011.01)
  *H04N 21/845* (2011.01)
  *H04N 21/2743* (2011.01)

(56) References Cited

U.S. PATENT DOCUMENTS

| | | | |
|---|---|---|---|
| 8,875,198 B1* | 10/2014 | Goodwin | H04N 21/25 725/87 |
| 8,942,542 B1 | 1/2015 | Sherrets et al. | |
| 9,049,477 B2 | 6/2015 | Liu et al. | |
| 2004/0170392 A1 | 9/2004 | Lu et al. | |
| 2006/0235821 A1* | 10/2006 | Armangau | G06F 17/30551 |
| 2010/0040341 A1 | 2/2010 | Yeh | |
| 2010/0158470 A1 | 6/2010 | Tzoukermann et al. | |
| 2010/0246965 A1 | 9/2010 | Epshtein et al. | |
| 2010/0329634 A1 | 12/2010 | Azulai | |
| 2011/0099195 A1 | 4/2011 | Patwardhan et al. | |
| 2012/0215630 A1 | 8/2012 | Surendran et al. | |
| 2013/0195422 A1 | 8/2013 | Patil et al. | |
| 2013/0226930 A1 | 8/2013 | Arngren et al. | |
| 2013/0262620 A1* | 10/2013 | Wood | G06F 17/30047 709/217 |
| 2014/0161417 A1* | 6/2014 | Kurupacheril | H04N 5/76 386/241 |
| 2015/0066920 A1 | 3/2015 | Balla | |
| 2015/0082349 A1 | 3/2015 | Ishtiaq et al. | |
| 2015/0100583 A1 | 4/2015 | Xi et al. | |
| 2015/0135241 A1* | 5/2015 | Stoller | H04N 21/4755 725/92 |
| 2015/0153906 A1 | 6/2015 | Liao et al. | |
| 2016/0006944 A1 | 1/2016 | Voss et al. | |
| 2016/0014482 A1* | 1/2016 | Chen | G11B 27/031 386/241 |
| 2017/0134828 A1 | 5/2017 | Krishnamurthy et al. | |

OTHER PUBLICATIONS

Erol, et al., "Partitioning of Video Objects into Temporal Segments Using Local Motion Information", In Proceedings of the International Conference on Image Processing, vol. 3, Sep. 10, 2000, pp. 945-948.

"International Search Report and Written Opinion Issued in PCT Application No. PCT/US2017/043572", dated Oct. 9, 2017, 11 Pages.

Rui, et al., "Constructing Table-of-Content for Videos", In Proceedings of the Multimedia Systems, vol. 7, Issue 5, Sep. 1, 1999, pp. 359-368.

* cited by examiner

| Time | Transcript | OCR | Sentiment | Topic | Face | Emotion (anger) | Emotion (happiness) | ... | Speaker | Voice Activity (music) | Voice Activity (cheering) | Background |
|---|---|---|---|---|---|---|---|---|---|---|---|---|
| 00:00 - 00:02 | "Hello everyone" | | 0.75 | Greeting | #1 | 0 | 0.60 | 0.40 | #1 | 0.88 | 0.99 | Stage, Hall |
| 00:02 - 00:07 | "I welcome you all to the" | CNN | 0.9 | Greeting | #1 | 0 | 0.60 | 0.40 | #1 | 0 | 0 | Stage |
| 01:45 - 02:30 | | CNN | 0.5 | | #2, #3, #4 | 0 | 0.99 | 0.01 | | 0 | 1 | Crowd |
| 03:40 - 04:00 | "This ends our broadcast" | | 0.5 | Broadcast | #5 | 0.2 | 0.4 | 0.4 | #2 | 0.5 | 0 | Panel |

FIG. 2A

|  | 360 | | | |
|---|---|---|---|---|
|  | 360A | 360B | 360C | 360D |
|  | Segment # | Source URL | Start Time | End Time |
| 350A | 1 | HTTPS://.../src1 | 0.00011574 | 0.0006944 |
| 350B | 2 | HTTPS://.../src1 | 0.00225694 | 0.0041088 |
| 350C | 3 | HTTPS://.../src2 | 0.0015162 | 0.0021875 |
| 350D | 4 | HTTPS://.../src3 | 0.0005787 | 0.0006829 |

# VIDEO SEGMENTATION AND SEARCHING BY SEGMENTATION DIMENSIONS

CROSS-REFERENCE TO RELATED APPLICATIONS

This application claims the benefit of U.S. Provisional Application Ser. No. 62/369,200, filed Aug. 1, 2016, entitled "VIDEO SEGMENTATION IN A VIDEO MANAGEMENT SYSTEM" which is incorporated herein by reference in its entirety.

BACKGROUND

Video hosting services support the sharing of video content. Videos can include short video clips and long video content. Video content can range from presentations to feature-length movies. A user of a video hosting service can upload a video to the video hosting service and allow other users to access and watch the video. Users of the video hosting services can playback video content using different types of video player applications. User interaction with the video content can also include searching for and identifying particular portions and elements of the video content. Searching for particular portions and elements of the video content helps circumvent watching the entire video content. As such, constructs in video hosting services that support search functionality for video content and assist users in identifying portions and elements of video content can be integral to a video hosting service and video content management.

SUMMARY

Embodiments described herein are directed to video segmentation for a video management system. At a high level, the video management system implements a video segment manager that supports generating enhanced segmented video. Enhanced segmented video is a time-based segment of video content. In particular, time-based video segmentation, to generate the enhanced segmented video, is based on logical segmentation using video content and values of segmentation dimensions. Enhanced segmented video is generated based on segmentation dimensions, segmentation rules and segment reconstruction rules. The segmentation dimensions are categories that are used to store video content characteristics or video content elements as values of the segmentation dimensions in a video content cognitive index. The video content cognitive index is built for indexing video content. The video content cognitive index is a data structure that arranges the video content based on the segmentation dimensions where the time-based segments of video content differ by duration of the video content.

Segmentation rules are rules that indicate how to select time-based segments of video content. Segmentation rules are applied to the video content to break the video content into time-based segments. The time-based segments are associated with corresponding segmentation dimensions for the corresponding portion of video content and the video content as a whole. Segment reconstruction rules are rules that indicate how to reconstruct time-based segments of video content. Segment reconstruction rules are then applied to the time-based segments to reconstruct (e.g., merge or split) the time-based segments into enhanced segmented video. The enhanced segmented video in one representation can be an index data entry having a plurality of attributes (e.g., values of segmentation dimensions). The index data entry is stored in a data structure (e.g., table) and references the original video content. The enhanced segmented video and corresponding values of the segmentation dimensions can be leveraged as distinct portions of the video content for different types of functionality in the video management system.

Embodiments described herein are further directed to video segment playlist generation for a video management system. At a high level, the video management system implements a video segment manager. The video segment manager supports generating video segment playlists for video content. Generating a video segment playlist is based on enhanced segmented video associated with segmentation dimensions. An enhanced segmented video is a time-based segment of video content generated based on segmentation dimensions, segmentation rules and segment reconstruction rules. The enhanced segmented video and corresponding segmentation dimensions facilitate searching video content based on the values of the segmentation dimensions for video content. In operation, the video segment manager receives a search query for the video content. The video segment manager identifies a plurality of relevant enhanced segmented videos that satisfy the search query. A selection of at least a subset of the plurality of relevant enhanced segmented videos is received to generate a video segment playlist. The video segment manager generates the video segment playlist comprising references to the subset of the plurality of relevant enhanced segmented videos. The video segment playlist, comprising the references, is communicated (e.g., as a file or link) and can be selected or executed to playback the subset of the plurality of relevant enhanced segmented videos.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 2A-2B are schematic exemplary representations of the process and an output index of the video management system, in accordance with embodiments described herein;

FIG. 7 is a flow diagram showing an exemplary method for implementing a video management system, in accordance with embodiments described herein; and.

DETAILED DESCRIPTION

Figure 1:
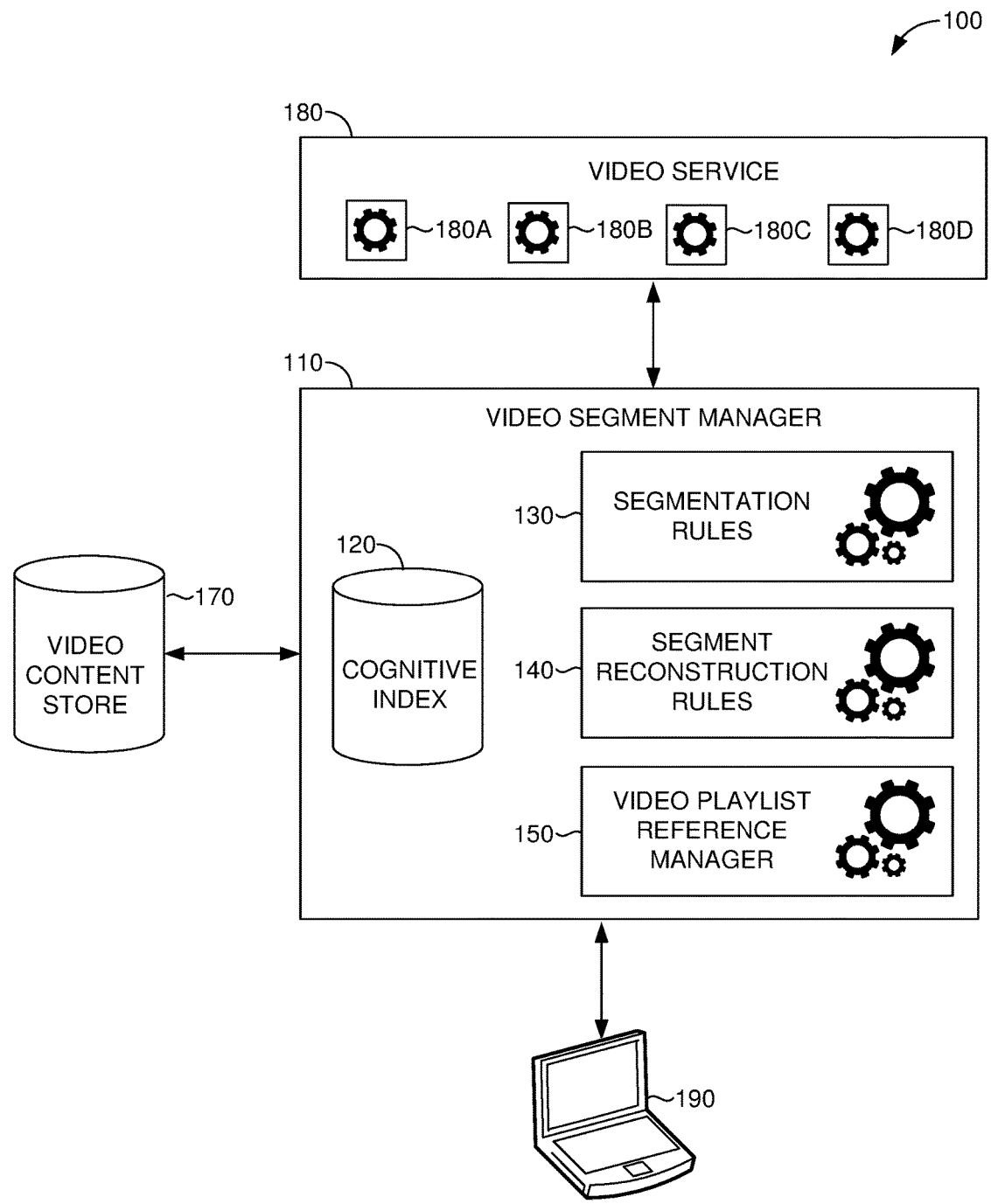
FIG. 1 is a block diagram of an exemplary video management system environment in which embodiments described herein may be employed.

Video hosting services support the sharing of video content. Videos can include short video clips and long video content. As used herein, video content implicates other inherent features of video, such as audio tracks, metadata, timecode etc. Video content can range from presentations to feature-length movies. A user of a video hosting service can upload a video to the video hosting service and allow other users to access and watch the video. Users of the video hosting services can playback video content using different types of video player applications. User interaction with the video content can also include searching for and identifying particular portions and elements of the video content. Searching for particular portions and elements helps circumvent watching the entire video content. As such, constructs in video hosting services that support search functionality for video content and assist users in identifying portions and elements video can be integral to a video hosting service and video content management.

By way of example, video content includes video portions (e.g., video scenes) that are compiled together for a defined period of time (e.g., duration of video content). The video scenes can include different video characteristics or video elements (e.g., speakers, location, time of day, etc.). Users are often interested in specific video portions and video elements in video content. For example, a user may try to find a meaningful portion of video content containing similar scenes or topics. Users rely on different types of searching mechanisms to identify video portions and video elements with varying levels of success. Often times, users simply fallback to inefficient options such as playing back the video at high speed to identify video portions and video elements in video content. Moreover, when meaningful video content is available as portions in multiple videos, this presents a challenge to most users trying to use portions of the different video content. For example, it can often require video editing tools and specific knowledge of the source video content to combine select portions of video content into a single continuous video. As such, a comprehensive system for searching, identifying, sharing and playing back relevant video content can improve the user experience with video content interactions.

Embodiments of the present invention provide simple and efficient methods and systems for video segmentation for a video management system. At a high level, the video management system implements a video segment manager that supports generating enhanced segmented video. The process of generating enhanced segmented video can be theoretically understood as a reverse stitching of the video content back into a conceptual storyboard having several enhanced segmented video. The enhanced segmented video refers to a time-based segment of video content generated based on segmentation dimensions, segmentation rules and segment reconstruction rules. The segmentation dimensions are part of a video content cognitive index that is built for the video content. The video content cognitive index is a data structure that arranges the video content based on the segmentation dimension. Segmentation rules are applied to the video content to break the video content into time-based segments of video content with values that are associated with the segmentation dimensions. Segment reconstruction rules are then applied to the time-based segments to reconstruct (e.g., merge or split) the time-based segments into enhanced segmented video. The enhanced segmented video in one representation can be an index data entry having a plurality of attributes (e.g., values of segmentation dimensions). The index data entry is stored in a data structure and references the original video content. The enhanced segmented video and the segmentation dimensions and corresponding values for the enhanced video content can be leveraged as distinct portions of the video content for different types of functionality in the video management system. By way of analogy, the time-based segments may correspond to paragraphs in an article and notes associated with the paragraph can be the values of the segmentation dimensions that further describe the enhanced segmented video.

Embodiments of the present invention also provide simple and efficient methods and systems for video segment playlist generation for a video management system. At a high level, the video management system implements a video segment manager that supports generating video segment playlists for video content. Generating a video segment playlist is based on enhanced segmented video associated with segmentation dimensions. An enhanced segmented video content is a time-based segment of video content generated based on segmentation dimensions, segmentation rules and segment reconstruction rules. The enhanced segmented video facilitates searching video content based on the segmentation dimensions and corresponding segmentation dimension values associated with the video content. As the video content is already broken down into values, based on the segmentation dimensions and sequential time-based segments, a user can perform an improved search of video content provided as enhanced segmented video.

In operation, the video segment manager receives a search query for the video content. The video segment manager identifies a plurality of relevant enhanced segmented videos that satisfy the search query. A selection of at least a subset of the plurality of relevant enhanced segmented videos is received to generate a video segment playlist. The video segment manager generates the video segment playlist comprising references to the subset of the plurality of relevant enhanced segmented videos. The video segment playlist can be configured to contain no video data and simply operate as a reference to the subset of the plurality of relevant enhanced segmented video. The video segment playlist having the references is communicated and can be selected to playback the subset of the plurality of relevant enhanced segmented video. During playback, the video segment manager can operate to calculate a total duration of the subset of the plurality of relevant enhanced segmented video. The video segment manager synchronizes a progress bar for the playback to simulate a unified video playback of video content. The video segment manager further operates to preload the sequence of the enhanced segmented videos from the video segment playlist for streaming without interruption.

Overall, advantageously, the video management system operates with improved technical efficiency. The use of computation resources is reduced as the video segment manager no longer encodes a compiled playlist into a video. The use of storage resources is also improved as different playlists and segments are not repeatedly stored. As the video segment playlist are delta playlists, built on top of others, owner's content rights are respected as when original segments are modified (e.g., correcting a video transcript) all deriving playlists are impacted.

Referring initially to FIG. 1, FIG. 1 illustrates an exemplary video management system 100 in which implementations of the present disclosure may be employed. In particular, FIG. 1 shows a high level architecture of a video management system 100 with a video segment manager 110. The video segment manager 110 having a cognitive index 120, segmentation rules 130, segment reconstruction rules 140 and a video segment playlist reference manager 150 in accordance with implementations of the present disclosure. The video management system 100 further includes video service 180 having a plurality of video services (or analyzers) (e.g., video service 180A, 180B, 180C and 180D), a video content store 170 and a client device 190.

Embodiments of the present disclosure are described in detail below with reference to examples such as a video management system having a video segment manager 110 for video segmentation and video segment playlist generation. The video segment manager 110 is responsible for generating enhanced segmented video. The video segment manager 110 generates enhanced segmented video using the cognitive index 120, segmentation rules 130 and segment reconstruction rules 140. The video segment manager 110 implements a video segmentation process that includes accessing video content and building a cognitive index associated with video content dimensions for the video content. Further, the video segment manager 110 uses segmentation rules to segment the video content into time-based segments and uses segment reconstruction rules to generate the enhanced segmented video. The video content can be accessed via the video content store 170 that operates as a data store or repository for collections of video content. Other variations and combinations of data stores and access mechanism for retrieve video content are contemplated with embodiments described herein.

The video segment manager 110 is responsible for building the cognitive index 120 for video content. A video content cognitive index can refer to an arrangement of video content based on video elements of the video content. The cognitive index 120 can be a data structure that arranges the video elements in a manner that allows for searching, analyzing and identifying portions of the video content based at least in part on the video and video content cognitive index. In particular, video elements of video content can be stored based on segmentation dimensions. This process can be referred to as a cognitive processing sequence. The segmentation dimensions are categories that are used to store video content characteristics or video elements as values of the segmentation dimensions in a video content cognitive index. In one embodiment, the categories may specifically be semantic signal channels hidden in the video. The segmentation dimensions can include, by way of example, time, transcript, sentiment, topic, face, emotion-anger, emotion-happiness, voice-activity-speaking, voice-activity cheering, background. As such, the segmentation dimensions can include dimensions with single facets (e.g., transcript) and dimensions with multiple facets (e.g., emotion). Other variations and combinations of segmentation dimensions are contemplated with embodiments of the present invention.

The video segment manager 110 can rely on video services (e.g., cognitive services and corresponding Application Programming Interfaces—APIs) to perform analysis (i.e., cognitive processing sequence) on video content to generate the video cognitive index. Cognitive sequence processing extracts cognitive insights from the video content itself. The video service 180 is an exemplary video service that performs video analysis and supports a plurality of cognitive services (e.g., 180A, 180B, 180C and 180C) to generate the cognitive index. In an exemplary embodiment, the cognitive processing sequence analyzes the video content into parallel time-based segmentation dimensions.

Figure 2B:
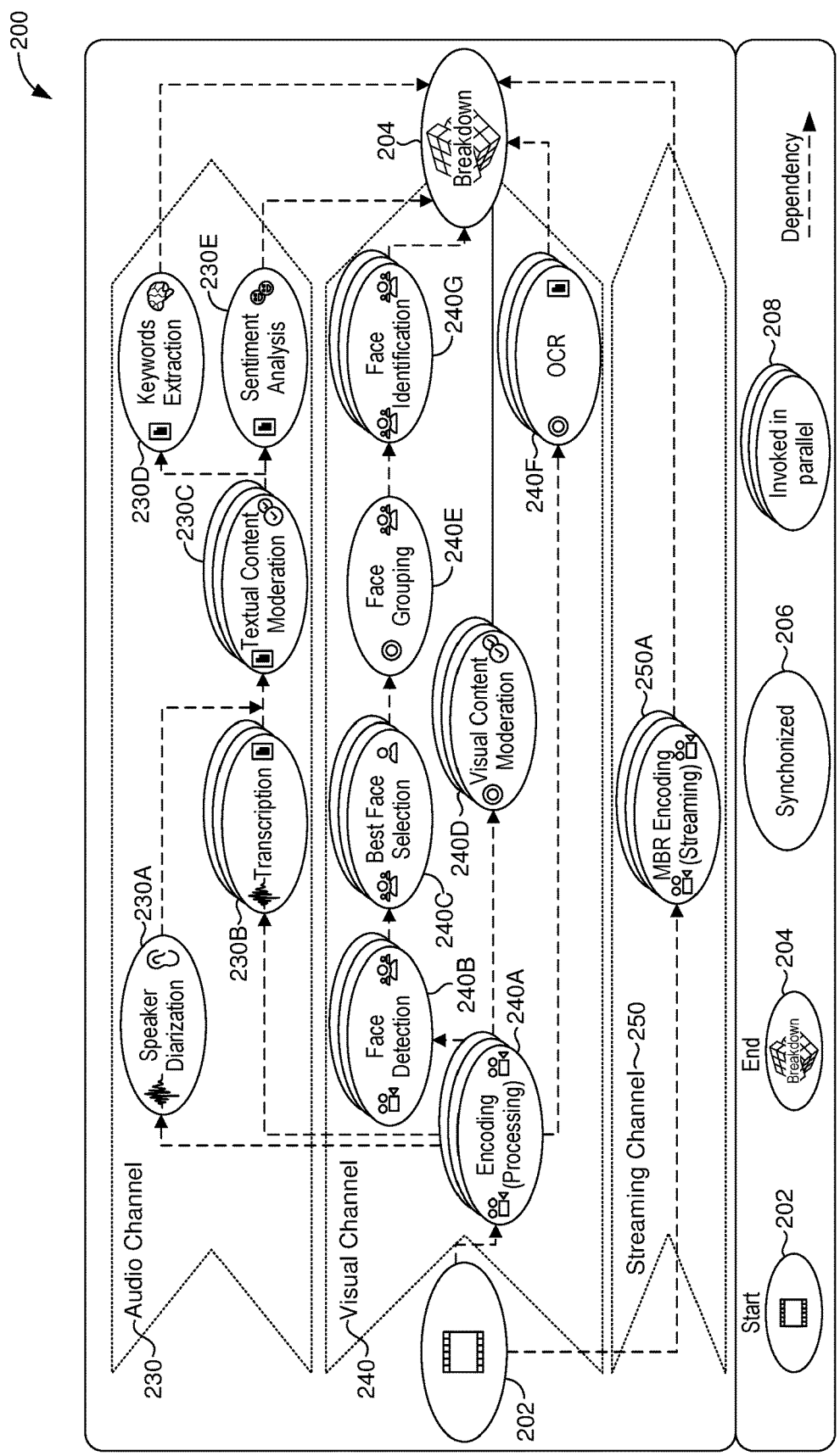

As shown in FIG. 2A, the cognitive index in one embodiment can be a table, where the columns 210 represent the segmentation dimensions (e.g., semantic signal channels) while the rows 220 represent cognitive insights found throughout the time axis. For example, time 210A, transcript 210B, OCR (optical character recognition) 210C, sentiment 210D, topic 210E, face 210F, emotion (anger) 210G, emotion (happiness) 210H, speaker 210I, voice activity (music) 210J, voice activity (cheering) 210K and background 210L are columns representing segmentation dimensions and time-segmented rows (220A, 220B, 220C, and 220D) representing cognitive insights or values corresponding to the segmentation dimensions. Deriving and utilizing these capabilities based on cognitive services can be visually represented as FIG. 2B, the sequence diagram 200 schematically illustrating features of the present disclosure. In particular, the video 202 on the left side is processed through the Audio Channel 230 for transcoding and Natural Language Processing (NLP), Visual Channel 240 for face recognition and Streaming Channel 250 for providing multiple bitrate and optimize streaming quality. The Audio Channel 230B can support outputs from following processes: speaker diarization 230A, transcription 230B, textual content moderation 230C, keywords extraction 230D and sentiment analysis 230E. As shown, outputs from some processes become input into other processes as part of the segmentation based on the segmentation rules. The Visual Channel 240 can support outputs from the following processes: encoding (processing) 240A, face detection 240B, best face selection 240C, visual content moderation 240D, face grouping 240E, face identification 240G, and OCR 240F. The streaming channel 250 can be used to support multiple bitrate (MBR) streaming via MBR encoding (streaming) 250A. The combined output is used to support breakdown 204 functionality as discussed in more detail herein. As turnover time between the end of the network upload and breakdown availability is cardinal for the user experience and in order to optimize performance, some steps are applied in parallel (e.g., invoked in parallel 208) on multiple video chunks or multiple face images and later concatenated back to the original sequential order.

The video segment manager 110 is responsible for segmenting the video content into time-based segments. At a high level, segmenting video content includes breaking the video content into sequential time-based segments, each containing the video content dimensions during its span. Segmenting the video content using segmentation dimensions associated with the cognitive index can in particular be based on a plurality of segmentation rules. A segmentation rule defines an occurrence that when true is an indication that a segment should be created for the video content. Segmentation rules can be stored and retrieved from segmentation rules 130. A time-based segment can be defined using a start point and an end point. Segmentation rules can be based on the segmentation dimensions of the cognitive index. Segmentation rules can include variations, combinations and prioritization of any of the following—the speaker changes, scenes change (i.e., based on visuals like background, faces, and audio aspects like background noise, music, and so on), the topic changes, a defined long term period of silence. In this regard, segmenting the video content into time-based segments can include identifying values of the segmentation dimensions to select a time-based segment.

The video segment manager 110 is also responsible for generating enhanced segmented video. The generated enhanced segmented video can be generated and stored in a video content store (e.g., video content store 170). The enhanced segmented video can be an index data entry having a plurality of attributes (e.g., values of segmentation dimensions), the index data entry is stored in a data structure and references the original video content. The enhanced segmented video and corresponding values of the segmentation dimensions can be leveraged as distinct portions of the video content for different types of functionality in the video management system. Generating the enhanced segmented video can specifically be based on reconstructing one or more time-based segments from the plurality of time-based segments, reconstructing the one or more time-based segments is based on segment reconstruction rules that indicate how to reconstruct time-based segments of video content.

Accordingly, the video segment manager 110 is further responsible for reconstruction of time-based segments. Reconstruction of segments can refer to recreating or rebuilding time-based segments based on segment reconstruction rules. Reconstruction can specifically be for time-based segments identified during the segmenting process. Segment reconstruction rules define an occurrence that when true is an indication that a segment should be reconstructed. A time-based segment can be reconstructed by merging time-based segments with one or more other time-based segments. A time-based segment can also be reconstructed by splitting the segment into one or more segments. Segment reconstruction rules can include variations, combinations and prioritization of any of the following: if there are two very short adjacent time-based segments of the same speaker, scene and topic, merge them into one; if a time-based segment reaches a predefined duration limit, split the time-based segment in enhanced segment videos, with respect to splitting in end of transcript lines. Reconstruction rules can be applied in absolute or a predefined percentile of the total duration of the time-based segment. Other variations and combinations of time-based segments are contemplated with embodiments of the present disclosure.

With continued reference to FIGS. 3A-3D, the video segment manager 110 is responsible for generating video segment playlists represented in different illustrations in FIGS. 3A, 3B, 3C and 3D. The video segment manager 110 supports generating video segment playlists for video content. The video segment manager 110 supports access to enhanced segmented video. The enhanced segmented video is a time-based segment of video generated based on segmentation dimensions, segmentation rules, and segment reconstruction rules. The video segment manager can access video content associated with an enhanced segmented video from a video content store (e.g., video content store 180) that stores enhanced segmented video. The enhanced segmented video, as described herein, is associated with segmentation dimensions and values of the segmentation dimensions.

The video segment manager 110 can access enhanced segmented videos and corresponding video content when a search query for video content is received at the video segment manager 110. A computing device (e.g., client device 190) can be used to access a graphical user interface (not shown) associated with the video segment manager 110 to enter a search query. In one embodiment, the video management system 100 and video segment manager 110 are part of a video hosting service. The video hosting service stores video content that is associated with a cognitive index as enhanced segmented video for performing searches.

Figures 3A, 3B:
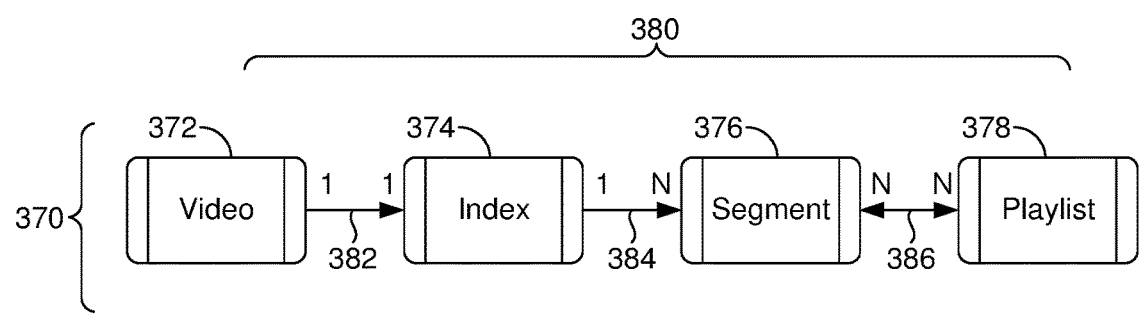
FIGS. 3A-3B are schematic exemplary representations of features of the video management system, in accordance with embodiments described herein.
Figure 3C:
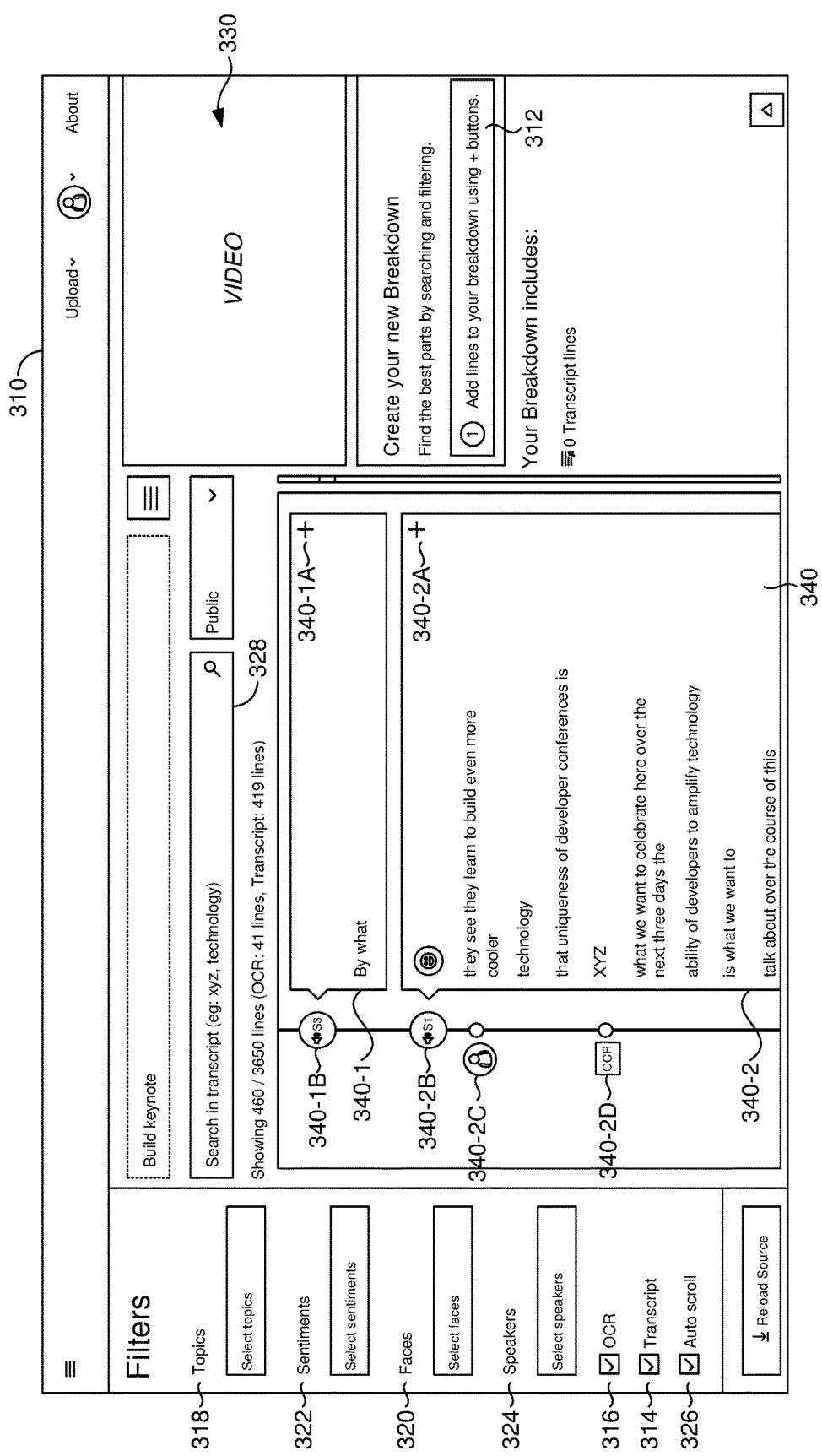
FIGS. 3C-3D are exemplary graphical user interfaces of the video management system, in accordance with embodiments described herein.
Figure 3D:
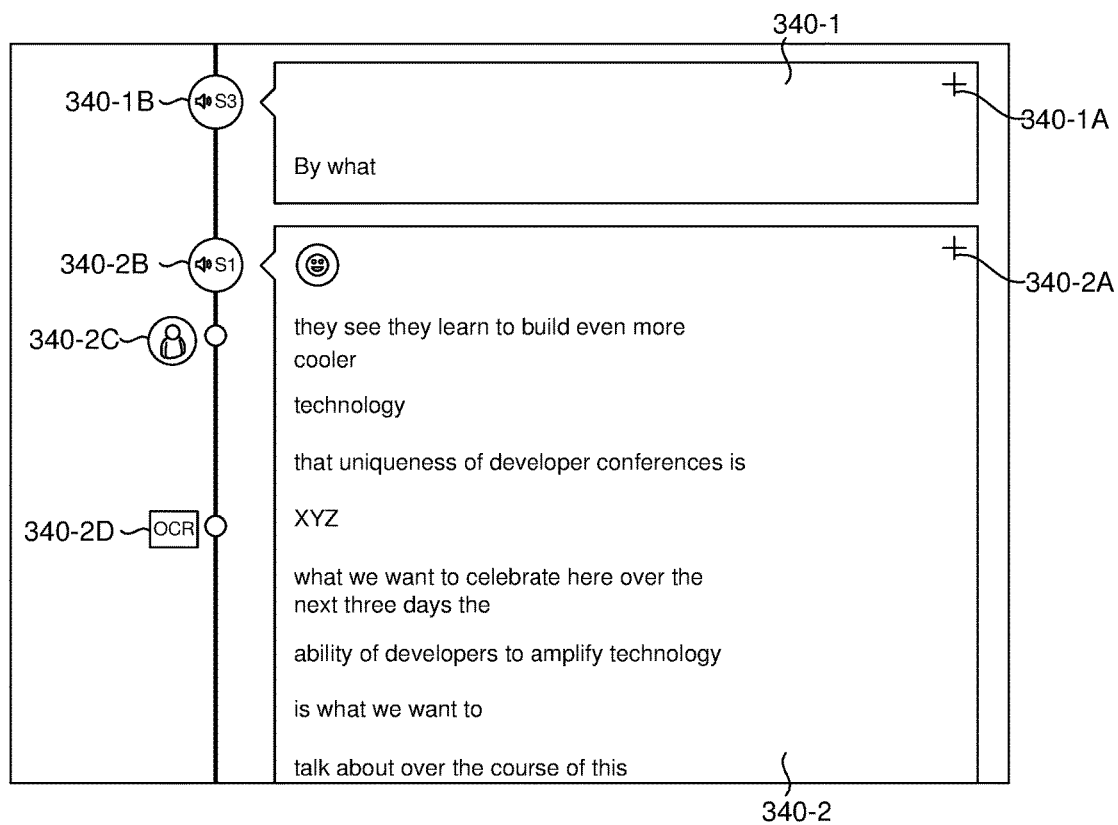

As shown in FIGS. 3C and 3D, the video segment manager 110 can operate with a graphical user interface 310 (e.g., video hosting interface) to support user interactivity with the video segment manager. The video segment manager 110 can receive the search query via a graphical user interface 310 and execute a search via the search input 312 to identify relevant enhanced segmented video. The video segment manager 110 operates to identify relevant enhanced segmented video for the search query. A relevant enhanced segmented video is an enhanced segmented video (e.g., index data entry) that satisfies the search query. Satisfying the search query can be based at least in part on values of the segmentation dimensions of the enhanced segmented video matching the search query. For example, searches can be associated with segmentation dimensions—Transcript 314: "Yes we can" or OCR 316 "Jason Bourne," or Scene: "beach" or Topic 318: "NBA" Face 320: "Lebron" and Sentiment 322: "Positive" or speakers 324. The formatting of the search above is exemplary and not meant to be limiting. However, it is contemplated that search query may be received in combination with an indication of a segmentation dimension to execute the search query in the indicated segmentation dimension. In this regard, the search query can be used to identify relevant enhanced segmented video.

With continued reference to FIGS. 3C and 3D, using the graphical user interface 310, for example, the user can make a selection of at least a subset of the relevant enhanced segmented video to generate a video segment playlist. The selection via the graphical user interface 310 may support selecting one or more relevant enhanced segmented videos and an indication of the selection is communicated to the video segment manager 110. The graphical user interface 310 includes several interface elements that support querying, identifying, filtering, selecting video content corresponding to enhanced segmented video for a "breakdown video" and sharing the breakdown video. Video content can be shown on a video viewer portion 330 of the graphical user interface 310 and additional functionality (e.g., auto scroll 326 and "Search in transcript" search bar 328) can made available via the graphical user interface 310. In particular, with reference to the enhanced segmented video interface portion 340 of the graphical user interface 310, several interface elements support visualizing enhanced segmented video and highlighting video elements or characteristics. For example, identified enhanced segmented video (e.g., segment bubble) can be added to a final breakdown video where enhanced segmented video can be visualized as segment bubbles (e.g., segment bubble 340-1 and segment bubble 340-2). In addition, audio icon 340-1B and audio icon 340-2B can be selectable audio icons associated with a corresponding segment bubble. Similarly, speaker icon 340-2C and OCR icon 340-2D and OCR text in the segment bubble can also be part of the video interface 340 for visualizing segment dimensions and performing interactive operations with embodiments described herein. The video segment manager 110 then generates and saves a video segment playlist from the one or more enhanced segmented videos. The video playlist, based on the enhanced segmented video in particular, includes references to the subset of the plurality of relevant enhanced segmented video. The video segment playlist in one embodiment does not contain any real data or video but operates as a reference (e.g., a pointer) to the original video content by way the enhanced segmented video.

By way of example, with reference to FIG. 3A, a video segment playlist can include 4 segments from 3 videos, where each segment is a data entry 350 (i.e., enhanced segmented video 350A, 350B, 350C and 350D) having attributes 360 (e.g., segment #360A, Source URL 360B, Start Time 360C and End Time 360D) as shown in FIG. 3A. In FIG. 3B, a relationship model 370 is illustrated with relationships between features of the video management system. For example, a video 372 has 1 index and each index belongs to 1 video (1:1) 382. An index 374 of N segments in and each segment belongs to 1 index (1:N) 384. A segment 376 can be referenced by N video segment playlists and a video segment playlist 378 can reference N segments (N:N) 386. The video segment playlist reference manager 150 can manage the relationship model 370, as described above, in an index to track references to and from video segment playlists to one or more video content segments.

The video segment playlist reference manager 150 can also store and communicate video segment playlists as needed to share video segment playlist and playback video content based on the video segment playlists. The video segment playlist having the references is communicated and can be selected to playback the subset of the plurality of relevant enhanced segmented video. During playback, the video segment manager 110 can operate to calculate a total duration of video content associated with the subset of the plurality of relevant enhanced segmented video. The video segment manager 110 synchronizes a progress bar for the playback to simulate a unified video playback of video content. The video segment manager 110 further operates to preload the sequence of the enhanced segmented video from the video segment playlist for streaming without interruption.

Figure 4:
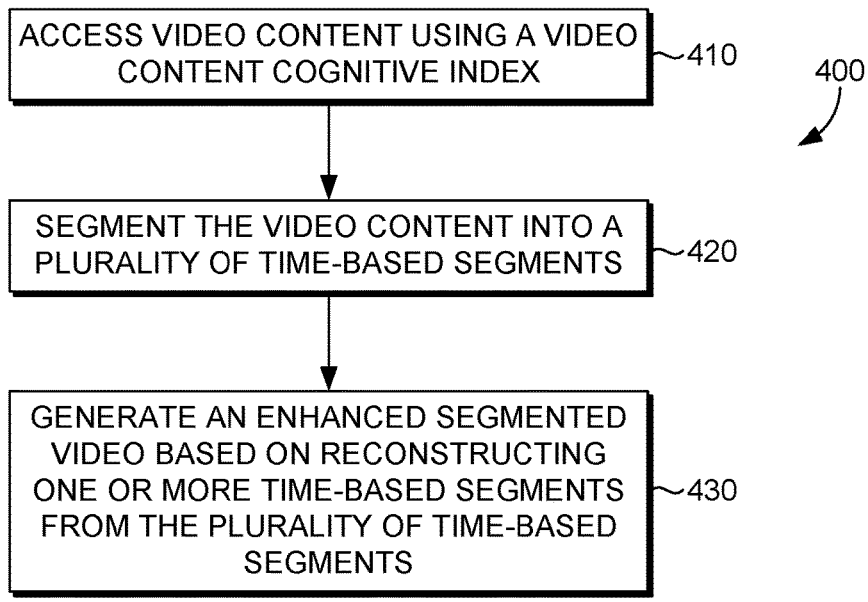
FIG. 4 is a flow diagram showing an exemplary method for implementing a video management system, in accordance with embodiments described herein.

Turning now to FIG. 4, a flow diagram is provided that illustrates a method for implementing functionality of a video management system. Initially at block 410, video content is accessed using a video content cognitive index. The video content is associated with a plurality of segmentation dimensions. The video cognitive index is generated based on a video analyzer service that analyzes the video content into parallel time-based dimensions to identify video elements associated with the plurality of segmentation dimensions. The segmentation rules are based at least in part on segmentation dimensions of the video cognitive index. At block 420, the video content is segmented into a plurality of time-based segments. Segmenting the video content is based on segmentation rules that indicate how to select time-based segments of video content. Segmenting the video content into a plurality of time-based segments comprises identifying values of the plurality of segmentation dimensions to select a time-based segment. At block 430, an enhanced segmented video is generated based on reconstructing one or more time-based segments from the plurality of time-based segments, reconstructing the one or more time-based segments is based on segment reconstruction rules that indicate how to reconstruct time-based segments of video content. The segment reconstruction rules are based at least in part on the plurality of dimensions of the video content cognitive index. Reconstructing the one or more time-based segments comprises splitting or merging selected time-based segments. The enhanced segmented video is searchable based at least in part on the plurality of segmentation dimensions and values of the plurality of segmentation dimensions of the enhanced segmented video.

Figure 5:
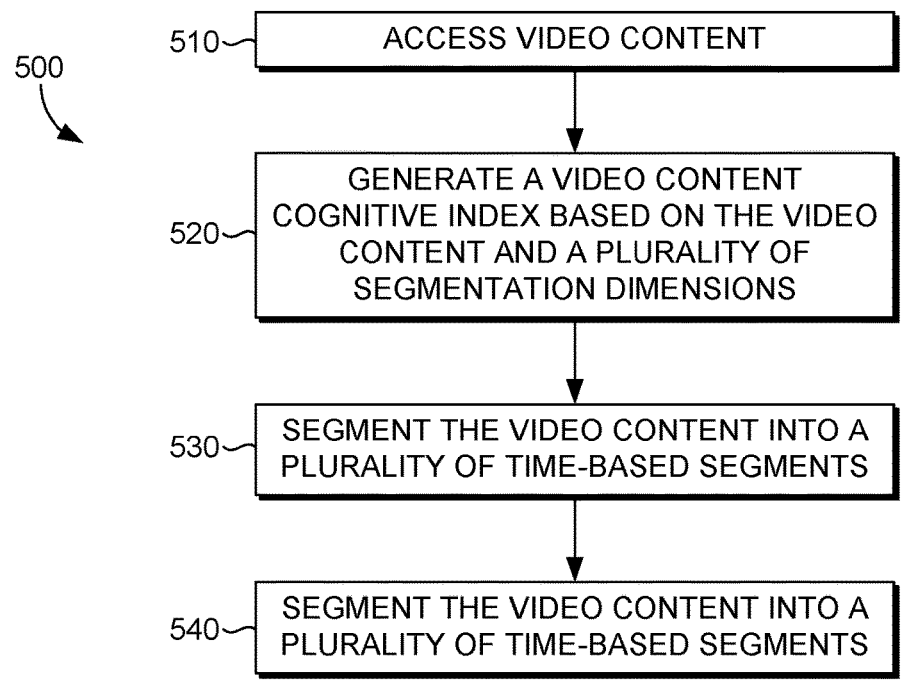
FIG. 5 is a flow diagram showing an exemplary method for implementing a video management system, in accordance with embodiments described herein.

Turning now to FIG. 5, a flow diagram is provided that illustrates a method for implementing functionality of a video management system. Computer storage media having computer-executable instructions embodied thereon that, when executed, by one or more processors, causes the one or more processors to perform the method for implementing functionality of a video management system. Initially at block 510, video content is accessed. At block 520, a video content cognitive index is generated based on video content and a plurality of segmentation dimensions. At block 530, the video content is segmented into a plurality of time-based segments. Segmenting the video content is based on segmentation rules that indicate how to select time-based segments of video content. At block 540, an enhanced segmented video is generated based on reconstructing one or more time-based segments from the plurality of time-based segments, reconstructing the one or more time-based segments is based on segment reconstruction rules that indicate how to reconstruct time-based segments of video content.

Figure 6:
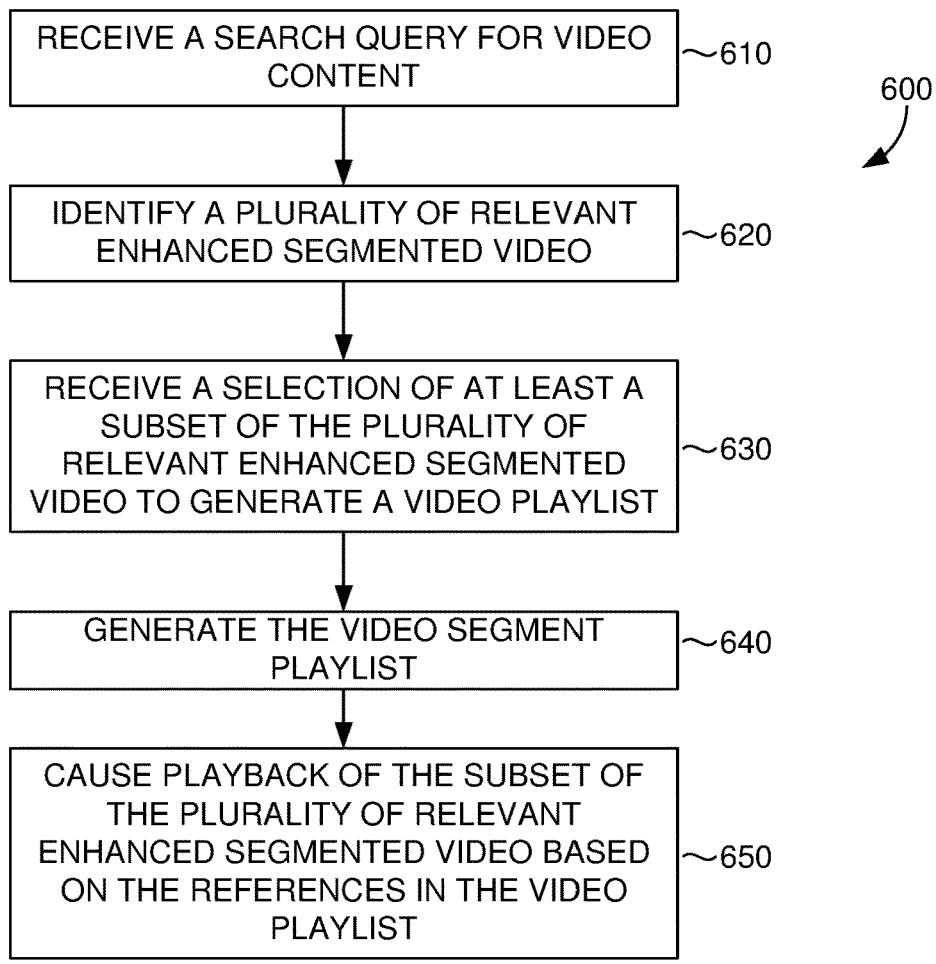
FIG. 6 is a flow diagram showing an exemplary method for implementing a video management system, in accordance with embodiments described herein.

Turning now to FIG. 6, a flow diagram is provided that illustrates implementing functionality of a video management system. Initially at block 610, a search query for video content is received. The enhanced segmented video is a time-based segment of video generated based on segmentation dimensions, segmentation rules and segmentation reconstruction rules. The search query is received in combination with an indication of a segmentation dimension to execute the search query in the indicated segmentation dimension. At block 620, a plurality of relevant enhanced segmented videos is identified. A relevant enhanced video segment is an enhanced segmented video that satisfies the search query based at least in part on the corresponding plurality of segmentation dimensions. At block 630, a selection of at least a subset of the plurality of relevant enhanced segmented videos is received to generate a video segment playlist. Receiving a selection of at least a subset of the plurality of relevant enhanced video segments is based on a graphical user interface that supports displaying representations of the plurality of relevant enhanced segmented videos and selection of the subset of the plurality of relevant enhanced segmented videos based on representations thereof. At block 640, the video segment playlist is generated. The video segment playlist comprises references to the subset of the plurality of relevant enhanced segmented videos. At block 650, playback of the subset of the plurality of relevant enhanced segmented videos based on the references in the video segment playlist is caused. Playback includes accessing video content based on enhanced segmented video associated with the plurality of segmentation dimensions. In particular, causing playback includes calculating a total duration of the subset of the plurality of relevant enhanced segmented videos and synchronizing a progress bar for the playback to simulate a unified video playback such that the subset of the plurality of relevant enhanced segmented videos is sequentially preloaded for uninterrupted streaming.

Figure 7:
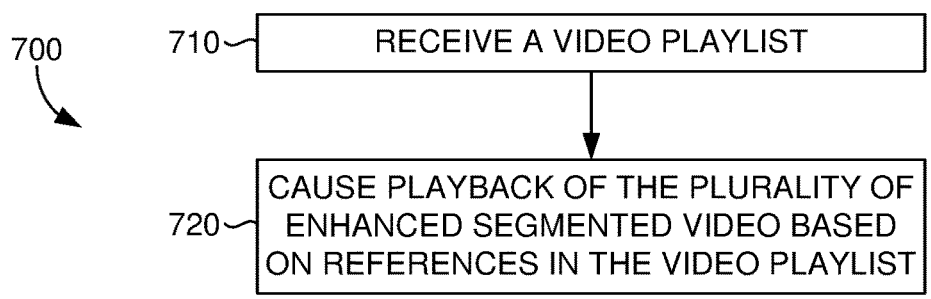

Turning now to FIG. 7, a flow diagram is provided that illustrates a implementing functionality of a video management system Computer storage media having computer-executable instructions embodied thereon that, when executed, by one or more processors, causes the one or more processors to perform the method for implementing functionality of a video management system. Initially at block 710, a video segment playlist is received. The video segment playlist comprises references to a plurality of enhanced segmented videos. An enhanced segmented video is a time-based segment of video generated based on segmentation dimensions, segmentation rules, and segment reconstruction rules. The video segment playlist is generated based on a selection of at least a subset of a plurality of relevant enhanced segmented videos to a search query. A relevant enhanced segmented video is an enhanced segmented video that satisfies the search query based at least in part of the corresponding values of a plurality of segmentation dimensions. At block 720, playback of the plurality of enhanced segmented video based on the references in the video segment playlist is caused.

With reference to the video management system 100, embodiments described herein can improve searching, identifying, sharing and playing back of relevant video content. The video management system components refer to integrated components that implement video management. The integrated components refer to the hardware architecture and software framework that support functionality using the video management system components. The hardware architecture refers to physical components and interrelationships thereof and the software framework refers to software providing functionality that can be implemented with hardware operated on a device. The end-to-end software-based video management system can operate within the other components to operate computer hardware to provide video management system functionality. As such, the video management system components can manage resources and provide services for the video management system functionality. Any other variations and combinations thereof are contemplated with embodiments of the present invention.

By way of example, the video management system can include an API library that includes specifications for routines, data structures, object classes, and variables may support the interaction the hardware architecture of the device and the software framework of the video management system. These APIs include configuration specifications for the video management system such that the components therein can communicate with each other in video management, as described herein.

Having identified various component of the video management system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The video management system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 8:
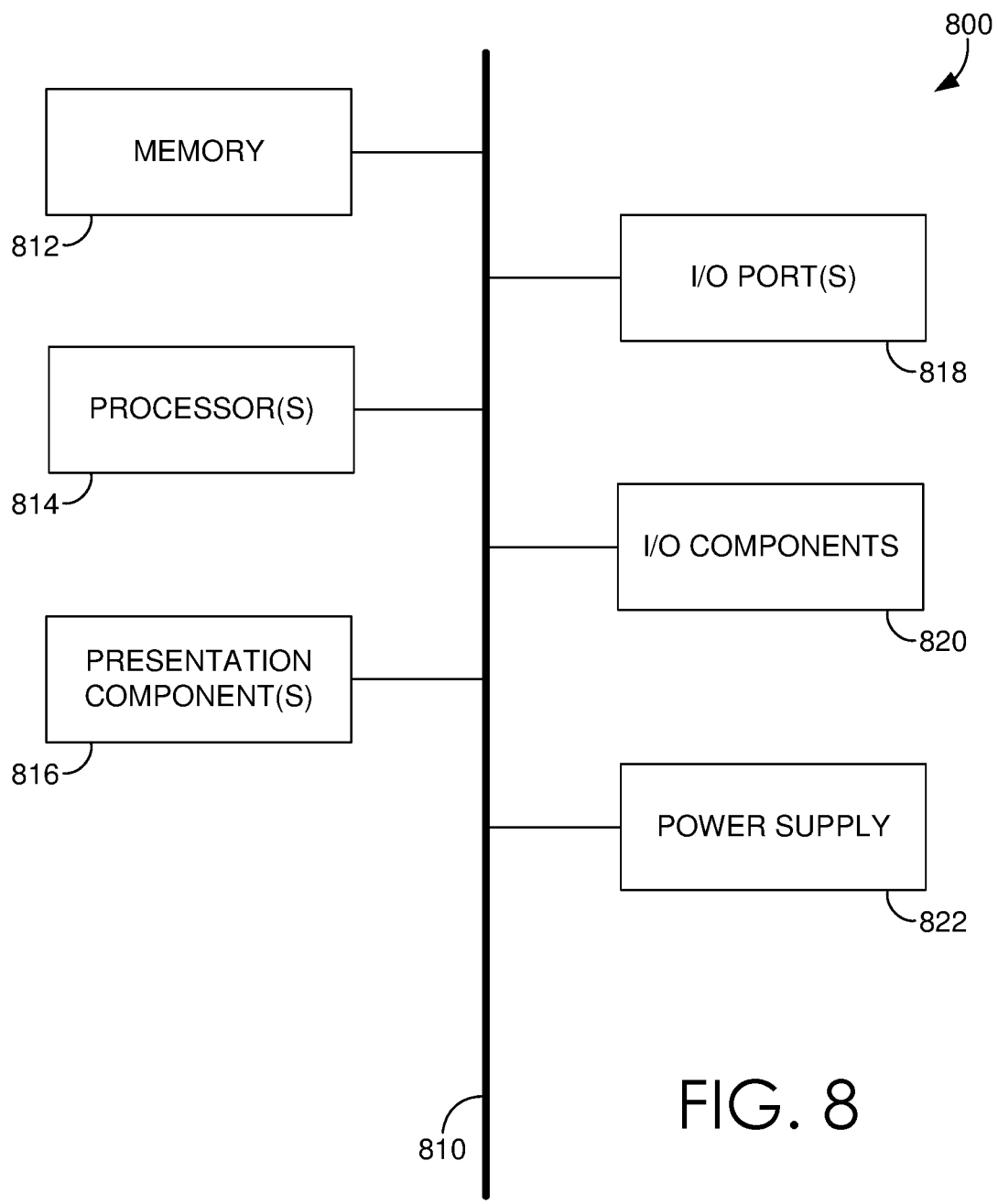
FIG. 8 is a block diagram of an exemplary computing environment suitable for use in implementing embodiments described herein.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," "mobile device," "wearable device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

For detailed discussion purposes, the video management system 100 is described as a mechanism associated with a plurality of components. A mechanism as used herein refers to any device, process, or service or combination thereof. A mechanism may be implemented using components as hardware, software, firmware, a special-purpose device, or any combination thereof. A mechanism may be integrated into a single device or it may be distributed over multiple devices. The various components of a mechanism may be co-located or distributed. The mechanism may be formed from other mechanisms and components thereof. The components of the resource management system 100 facilitate providing functionality described herein.

For purposes of a detailed discussion above, embodiments are described with reference to distributed computing devices, components, and a video management system components. Components can be configured to perform novel aspects of embodiments described herein, where "configured to" includes components that are programmed to perform particular tasks or implement particular abstract data types using computer code. It is contemplated that the methods described herein can be performed in different types of operating environments having alternate configurations of the functional components described herein. As such, the embodiments described herein are merely exemplary, and it is contemplated that the techniques may be extended to other implementation contexts.

For purposes of this disclosure, the word "including" has the same broad meaning as the word "comprising," and the word "accessing" involves "receiving," "referencing," or "retrieving." In addition, words such as "a" and "an," unless otherwise indicated to the contrary, include the plural as well as the singular. Further the word "communicating" has the same broad meaning as the word "receiving," or "transmitting" facilitated by software or hardware-based buses, receivers, or transmitters" using communication media described herein. Thus, for example, the constraint of "a feature" is satisfied where one or more features are present. Also, the term "or" includes the conjunctive, the disjunctive, and both (a or b thus includes either a or b, as well as a and b).

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing video management, the system comprising:
one or more hardware processors and memory storing computer-executable instructions and components embodied thereon that, when executed, by the one or more hardware processors, cause the hardware processors to:
generate a video content cognitive index based on video content and a plurality of segmentation dimensions;
for a plurality of points within the video content, quantify the video content for each of the plurality of segmentation dimensions via one or more video analyzers such that each point within the video content has a value for each of the plurality of segmentation dimensions;
segment the video content into a plurality of time-based segments;
upon segmenting the video content into the plurality of time-based segments, generate an enhanced segmented video including one or both of a segment reconstruction rule to merge two or more time-based segments shorter than a first threshold length into a longer time-based segment, and a segment reconstruction rule to split a time-based segment longer than a second threshold length into two or more shorter time-based segments;
receive a search query for video content;
based on values of the plurality of segmentation dimensions for each of the plurality of time-based segments, identify one or more time-based segments relevant to the search query; and
generate a video segment playlist from the one or more time-based segments relevant to the search query.

2. The system of claim 1, wherein generating the video content cognitive index is based on a video analyzer service that analyzes the video content to identify video elements associated with the plurality of segmentation dimensions.

3. The system of claim 1, wherein generating the video content cognitive index is based on analyzing the video content into parallel time-based dimensions for the plurality of segmentation dimensions.

4. The system of claim 1, wherein the segment reconstruction rules are based at least in part on the plurality of segmentation dimensions of the video content cognitive index.

5. A computer-implemented method for video management, the method comprising:
    accessing video content using a video content cognitive index, wherein the video content is associated with a plurality of segmentation dimensions such that different portions of the video content have different values for each of the plurality of segmentation dimensions;
    segmenting the video content into a plurality of time-based segments;
    upon segmenting the video content into the plurality of time-based segments, generating an enhanced segmented video based on segment reconstruction rules including one or both of a segment reconstruction rule to merge two or more time-based segments shorter than a first threshold length into a longer time-based segment, and a segment reconstruction rule to split a time-based segment longer than a second threshold length into two or more shorter time-based segments;
    receiving a search query for video content; and
    based on values of the plurality of segmentation dimensions for each of the plurality of time-based segments, identifying one or more time-based segments relevant to the search query.

6. The method of claim 5, wherein the video content cognitive index is generated based on a video analyzer service that analyzes the video content into parallel time-based dimensions to identify video elements associated with the plurality of segmentation dimensions.

7. The method of claim 5, wherein the segment reconstruction rules are based at least in part on the plurality of segmentation dimensions of the video content cognitive index.

8. One or more computer storage media having computer-executable instructions embodied thereon that, when executed, by one or more processors, causes the one or more processors to perform a method for video management, the method comprising:
    accessing video content;
    generating a video content cognitive index based on video content and a plurality of segmentation dimensions, such that different portions of the video content have different values for each of the plurality of segmentation dimensions;
    segmenting the video content into a plurality of time-based segments;
    upon segmenting the video content into the plurality of time-based segments, generating an enhanced segmented video based on segment reconstruction rules including one or both of a segment reconstruction rule to merge two or more time-based segments shorter than a first threshold length into a longer time-based segment, and a segment reconstruction rule to split a time-based segment longer than a second threshold length into two or more shorter time-based segments;
    receiving a search query for video content; and
    based on values of the plurality of segmentation dimensions for each of the plurality of time-based segments, identifying one or more time-based segments relevant to the search query.

* * * * *